(12) United States Patent
Gebhart et al.

(10) Patent No.: US 7,930,338 B2
(45) Date of Patent: Apr. 19, 2011

(54) OBSERVER FOR GRID-ENABLED SOFTWARE APPLICATIONS

(75) Inventors: Alexander Gebhart, Bad Schoenborn (DE); Erol Bozak, Pforzheim (DE)

(73) Assignee: SAP AG, Walldorf (DE)

( * ) Notice: Subject to any disclaimer, the term of this patent is extended or adjusted under 35 U.S.C. 154(b) by 1617 days.

(21) Appl. No.: 11/017,562

(22) Filed: Dec. 20, 2004

(65) Prior Publication Data

US 2006/0136884 A1  Jun. 22, 2006

(51) Int. Cl.
*G06F 15/177* (2006.01)

(52) U.S. Cl. .............. 709/200; 709/201; 709/220; 717/140

(58) Field of Classification Search .......... 709/200, 709/201, 220; 717/140
See application file for complete search history.

(56) References Cited

U.S. PATENT DOCUMENTS

| | | | |
|---|---|---|---|
| 7,426,554 B2 * | 9/2008 | Kennedy | 709/223 |
| 7,526,515 B2 * | 4/2009 | Broussard et al. | 707/205 |
| 2005/0283786 A1 * | 12/2005 | Dettinger et al. | 718/104 |
| 2006/0130066 A1 * | 6/2006 | Bozak et al. | 718/104 |

* cited by examiner

*Primary Examiner* — Adnan Mirza
(74) *Attorney, Agent, or Firm* — Finnegan, Henderson, Farabow, Garrett & Dunner, L.L.P.

(57) ABSTRACT

A method includes, in a network of interconnected grid compute nodes, receiving a request to execute an application in the network, registering the application, determining whether the application meets a threshold to enable assigning the application to one of the grid compute nodes within the network, assigning the application to execute on a specific grid compute node having no other current applications executing, preparing the grid compute node for execution of the application, recovering the grid compute node if the application terminates prematurely, and deregistering the application on the grid compute node if the application executes successfully.

30 Claims, 2 Drawing Sheets

OBSERVER FOR GRID-ENABLED SOFTWARE APPLICATIONS

TECHNICAL FIELD

The present invention relates to data processing by digital computer, and more particularly to an observer for grid-enabled software applications.

BACKGROUND

Grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of the creation of virtual organizations for applications and data sharing.

Some grid-enabled software applications running in a grid network require special observation. These applications include, for example, long running applications/transactions, applications written in a specific programming language, such as C or C++, and applications with a failure history that indicates a high likelihood of failure. If such applications are not treated with special care, there is a chance that they can corrupt parts or all of a grid network infrastructure.

SUMMARY

The present invention provides methods and apparatus, including computer program products, for an observer for grid-enabled software applications.

In one aspect, the invention features a method including, in a network of interconnected grid compute nodes, receiving a request to execute an application in the network, registering the application, determining whether the application meets a threshold to enable assigning the application to one of the grid compute nodes within the network, assigning the application to execute on a specific grid compute node having no current applications executing, preparing the specific grid compute node for execution of the application, recovering the specific grid compute node if the application terminates prematurely, and deregistering the application on the specific grid compute node if the application executes successfully.

In embodiments, the threshold can represent a minimum of application execution success rates. Assigning can include denying access to the network if the application fails to meet the threshold.

Preparing can include blocking other applications attempting to access the specific grid compute node, negotiating with the application to provide periodic status messages, and obtaining an initial snapshot of the specific grid compute node prior to execution of the application.

The initial snapshot can include all resources managed by the specific grid compute node, the resources including a listing of local files and directories, a total amount of used disk space, a list of used and free Transmission Control Protocol/Internet Protocol (TCP/IP) ports, memory usage and/or a number of executing processes.

The initial snapshot can include an image stored in an advanced hardware management system over an application program interface (API). The advanced hardware management system can include a blade management system.

Recovering can include comparing a current snapshot with the initial snapshoot, and adjusting differences found in the current snapshot in response to the comparing.

Recovering can include comparing a current snapshot with the initial snapshoot, and rebooting the specific grid compute node in response to the comparing.

Recovering can include comparing a current snapshot with the initial snapshoot, and installing a new image on the specific grid compute node. The new image can include a software grid manager service residing inside a grid container. Recovering can also include reconnecting the specific grid compute node to the network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
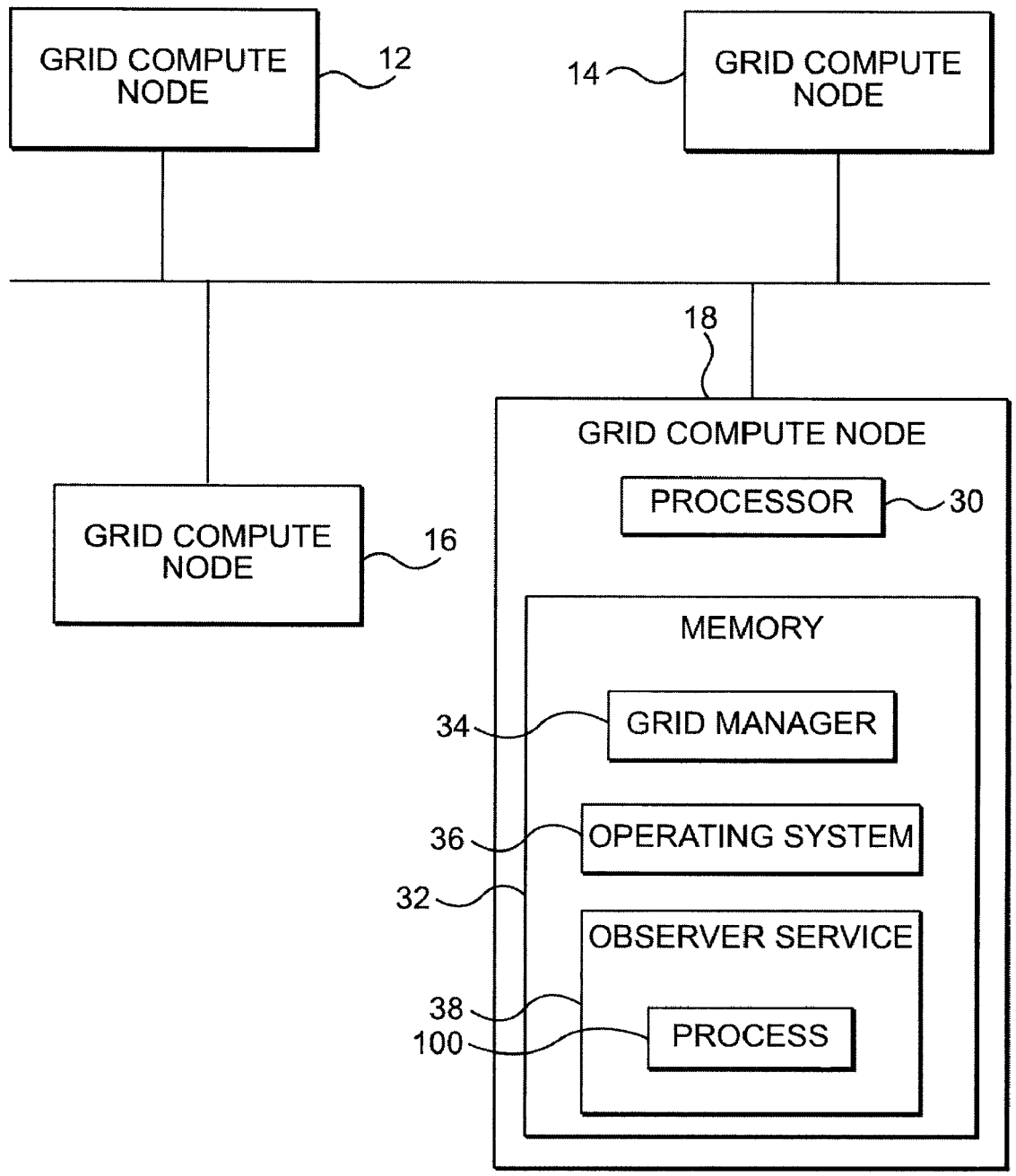
FIG. 1 is block diagram.

As shown in FIG. 1, a grid network 10 in accordance with one embodiment of the invention includes a number of interconnected grid compute nodes 12, 14, 16, 18. In an example, the grid network 10 is implemented as a client-server network. Client/server describes a relationship between two computer programs in which one program, the client, makes a service request from another program, the server, which fulfills the request. Although the client/server idea can be used by programs within a single computer, it is a more important idea in a network, such at network 10. In a network, the client/server model provides a convenient way to interconnect programs that are distributed efficiently across different locations.

In the client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services from a Web server in another computer somewhere on the Internet.

Each of the grid compute nodes, grid compute node 18 for example, can include a processor 30 and a memory 32. Memory 32 includes a grid manager 34, an operating system (OS) 36, such as Unix, Linux or Windows, and grid application observation service 38, which executes a grid application observation process 100. As grid-enabled software applications are deployed, executed, and terminated within the grid network 10, the grid application observation process 100 monitors grid-enabled applications that are sensitive and can cause grid network problems.

The grid application observation process 100 monitors identified grid-enabled applications and removes them immediately during or after execution in case the specific grid compute node handling the application fails to revert to its original state prior to execution of the grid-enabled application.

Figure 2:
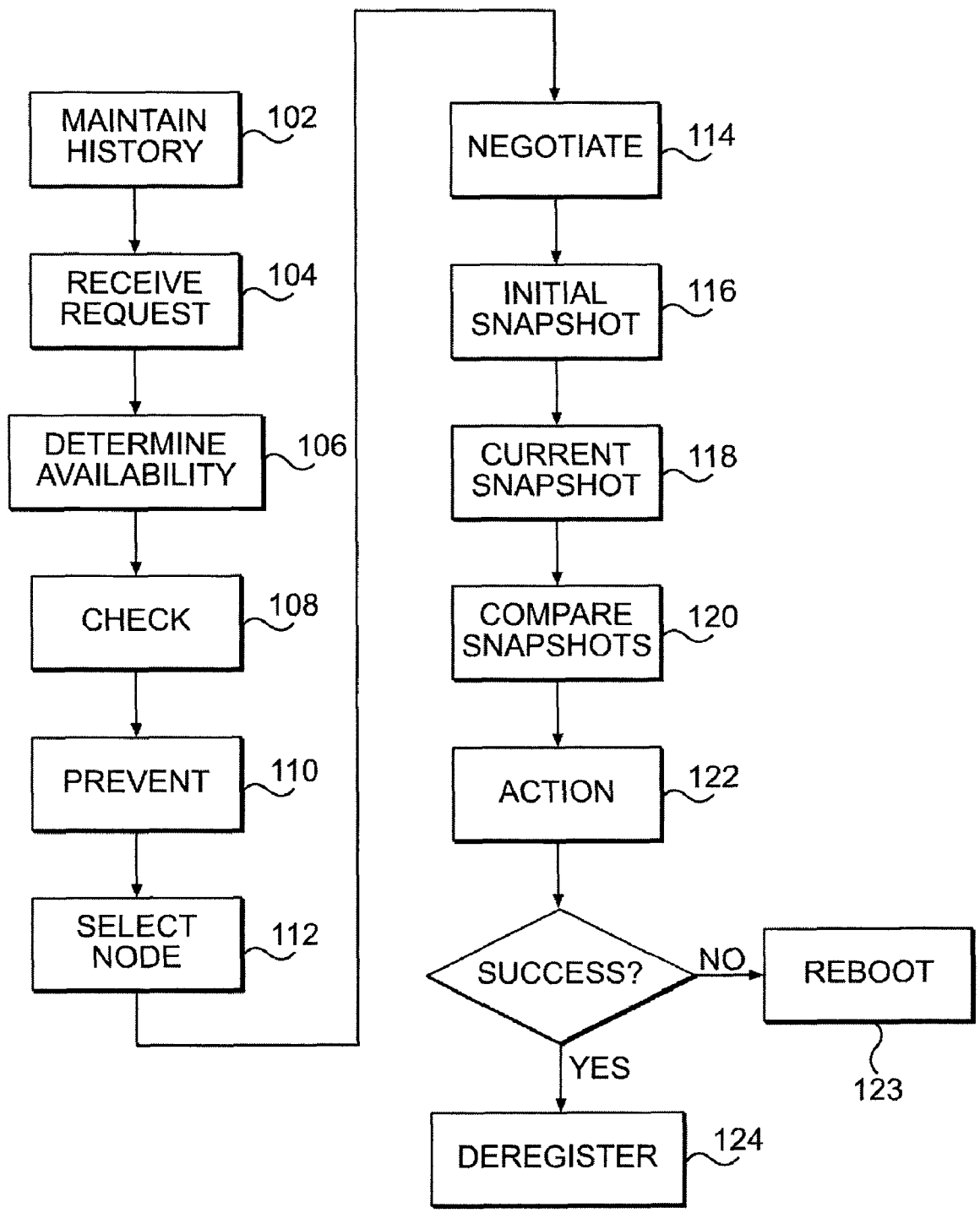
FIG. 2 is a flow diagram.
Like reference symbols in the various drawings indicate like elements.

As shown in FIG. 2, grid application observation process 100 includes maintaining (102) a history of application executions in a grid network, the history including a list of the number of times applications failed to execute. Process 100 receives (104) a request to run an application on a grid compute node and determines (106) if there are any grid compute nodes within the grid network available to execute the application. The request includes an indication that the application is a critical application that requires special observation.

Process 100 checks (108) the application against data contained in the history to determine whether the requested application has failed to run more often than a predetermined number of times. If the application has failed to run more than the predetermined number of times, process 100 prevents (110) the application from being deployed in the grid network. Preventing (110) can also include sending a notification to an administrator that the application was denied grid network resources.

If process 100 grants the application access to the grid network, process 100 selects (112) a specific grid compute node that currently has no applications running so as to minimize an impact in the event of application failure.

Prior to execution of the application on the selected grid compute node, process 100 negotiates (114) with the grid-enabled application. Negotiation (114) includes determining how often the application, while executing in the selected grid compute node, sends "keep alive" messages to the grid application observer service 38. In a particular example, this is specified in a policy file.

Process 100 takes an initial snapshot (115) of the selected grid compute node prior to application execution. In one example, the snapshot can be software-based, i.e., the snapshot can include all resources that are managed by the grid compute node, such as a listing of all files and directories, the total used disk space, a list of all used and free TCP/IP ports, memory usage, number of running processes, and so forth. In another example, the snapshot can be hardware-based, i.e., an advanced hardware management system, such as a blade management system, can be informed via an application programming interface (API) to obtain and store an image.

If the application crashes during execution on the selected grid compute node (e.g., a keep-alive message is not received at a designated interval), process 100 takes a current snapshot (118) and compares (120) it to the initial snapshot taken prior to executing the application. Process 100 attempts to take action (122) to achieve the prior state, as defined in the initial snapshoot. Example actions include deleting new files and/or, if memory usage is too high, delete running processes that should not run and/or stop them.

If process 100 fails to achieve the prior state, process 100 reboots (123) the grid compute node.

In a particular hardware-based example solution, an advanced hardware management system (e.g., a blade management system or mainframe management system) utilizes process 100. If process 100 fails to achieve the prior state, the advanced hardware management system is instructed to put the image back on the selected grid compute node. In this example, the grid application observer service 38 includes an application programming interface (API) or other communication mechanism to the advanced hardware management system to initiate putting a new image to the selected grid compute node. The new image contains a software grid manager service residing inside a grid container. Once the selected grid compute node is clean (e.g., new image installed) and restarted it connects to the grid network 10. This can be achieved in different ways. For example, service "M" is started automatically at boot time and starts listening to a certain communication channel (e.g., a TCP/IP port). Prior to initiating the hard disk image replacement, service "M" residing on machine M1 communicates to another machine M2 in the grid network 10 that a restart is taking place (e.g., via a service "M" residing on that machine), and is passing necessary configuration data (e.g., superior/inferior information). Service "M" residing on machine M2 has the task to poll at certain intervals for machine M1 until it has rebooted. After that, service "M" residing on M2 provides configuration information to service "M" residing on M1, which is used to link the machine to the grid network 10. In another particular example, a special grid service or application takes care of attaching rebooted machines to the grid network centrally.

The grid application observer service 38 notifies service "M" that the application has to be deployed and started again. Service "M" updates list "L" of failed attempts to run certain applications. Optionally, a notification to a monitoring system or an email to an operator can be sent concerning the failed attempt to run the application.

If the execution of the grid-enabled application is successful, process 100 de-registers (124) the application prior to terminating. If this is omitted or forgotten, process 100 will not get any "keep alive" messages. When this happens, process 100 checks whether the selected grid node is in the same condition as prior to starting the application. If so, process 100 assumes that the application did not crash and de-registers it automatically.

In other embodiments, when checking for available grid compute nodes, those controlled by an advanced hardware management system (e.g., a blade management system) are preferred because for such types of machines an image can be taken automatically.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
   receiving, in a network of interconnected grid compute nodes, a request to execute an application in the network;
   registering the requested application;
   maintaining a history of application executions in a grid network, wherein the history includes a list of a number of times each application in the grid network previously failed to execute;
   determining, based on the history of application executions, whether the requested application has previously failed to execute more often than a predetermined number of times;
   deploying the requested application on the network based on a determination that the requested application has not previously failed to execute more often than the predetermined number of times, the deploying including:
      assigning the requested application to execute on a specific grid compute node having no other current applications executing;
      preparing the specific grid compute node for execution of the requested application;
      recovering the specific grid compute node if execution of the requested application fails; and
      deregistering the requested application on the specific grid compute node if the requested application executes successfully; and
   preventing deployment of the requested application on the network based on a determination that the requested application has previously failed to execute more often than the predetermined number of times.

2. The method of claim 1 wherein preparing comprises:
   blocking applications attempting to access the specific grid compute node;
   negotiating with the requested application to provide periodic status messages; and
   obtaining an initial snapshot of the specific grid compute node prior to execution of the requested application.

3. The method of claim 2 wherein the initial snapshot comprises all resources managed by the specific grid compute node, the resources including a listing of local files and directories, a total amount of used disk space, a list of used and free Transmission Control Protocol/Internet Protocol (TCP/IP) ports, memory usage and a number of executing processes.

4. The method of claim 2 wherein the initial snapshot comprises an image stored in an advanced hardware management system over an application program interface (API).

5. The method of claim 4 wherein the advanced hardware management system comprises a blade management system.

6. The method of claim 2 wherein recovering comprises:
   comparing a current snapshot of the specific grid compute node with the initial snapshot; and
   adjusting differences found in the current snapshot in response to the comparing.

7. The method of claim 2 wherein recovering comprises:
   comparing a current snapshot with the initial snapshot; and
   rebooting the specific grid compute node in response to the comparing.

8. The method of claim 2 wherein recovering comprises:
   comparing a current snapshot of the specific grid compute node with the initial snapshot; and
   installing a new image on the specific grid compute node.

9. The method of claim 8 wherein the new image includes a software grid manager service residing inside a grid container.

10. The method of claim 8 wherein recovering further comprises reconnecting the specific grid compute node to the network.

11. A non-transitory computer-readable storage medium storing a computer program that, when executed by a data processing apparatus, is operable to cause the data processing apparatus to:
    receive, in a network of interconnected grid compute nodes, request to execute an application in the network;
    register the requested application;
    maintain a history of application executions in a grid network, wherein the history includes a list of a number of times each application in the grid network previously failed to execute;
    determine, based on the history of application executions, whether the requested application has previously failed to execute more often than a predetermined number of times;
    deploy the requested application on the network based on a determination that the requested application has not previously failed to execute more often than the predetermined number of times, the deploying including:
       assigning the requested application to execute on a specific grid compute node having no other current applications executing;
       preparing the specific grid compute node for execution of the requested application;
       recovering the specific grid compute node if execution of the requested application fails; and
       deregistering the requested application on the specific grid compute node if the requested application executes successfully; and
    prevent deployment of the requested application on the network based on a determination that the requested application has previously failed to execute more often than the predetermined number of times.

12. The non-transitory computer-readable storage medium of claim 11 wherein preparing comprises:
    blocking access to other applications attempting to access the specific grid compute node;
    negotiating with the requested application to provide periodic status messages; and
    obtaining an initial snapshot of the specific grid compute node prior to execution of the requested application.

13. The non-transitory computer-readable storage medium of claim 12 wherein the initial snapshot comprises all resources managed by the specific grid compute node, the resources including a listing of local files and directories, a total amount of used disk space, a list of used and free Transmission Control Protocol/Internet Protocol (TCP/IP) ports and memory usage and a number of executing processes.

14. The non-transitory computer-readable storage medium of claim 12 wherein the initial snapshot comprises an image stored in an advanced hardware management system over an application program interface (API).

15. The non-transitory computer-readable storage medium of claim 14 wherein the advanced hardware management system comprises a blade management system.

16. The non-transitory computer-readable storage medium of claim 12 wherein recovering comprises:
   comparing a current snapshot with the initial snapshot; and
   adjusting differences found in the current snapshot in response to the comparing.

17. The non-transitory computer-readable storage medium of claim 12 wherein recovering comprises:
   comparing a current snapshot with the initial snapshot; and
   rebooting the specific grid compute node in response to the comparing.

18. The non-transitory computer-readable storage medium of claim 12 wherein recovering comprises:
   comparing a current snapshot with the initial snapshot; and
   installing a new image on the specific grid compute node.

19. The non-transitory computer-readable storage medium of claim 18 wherein the new image includes a software grid manager service residing inside a grid container.

20. The non-transitory computer-readable storage medium of claim 18 wherein recovering further comprises reconnecting the specific grid compute node to the network.

21. An apparatus comprising:
   a processor;
   means for receiving, in a network of interconnected grid compute nodes, a request to execute an application in the network;
   means for registering the requested application;
   means for maintaining a history of application executions in a grid network, wherein the history includes a list of a number of times each application in the grid network previously failed to execute;
   means for determining, based on the history of application executions, whether the requested application has previously failed to execute more often than a predetermined number of times;
   means for deploying the requested application on the network based on a determination that the requested application has not previously failed to execute more often than the predetermined number of times, the means for deploying including:
      means for assigning the requested application to execute on a specific grid compute node having no other current applications executing;
      means for preparing the specific grid compute node for execution of the requested application;
      means for recovering the specific grid compute node if execution of the requested application fails; and
      means for deregistering the requested application on the specific grid compute node if the requested application executes successfully; and
   means for, preventing deployment of the requested application on the network based on a determination that the requested application has previously failed to execute more often than the predetermined number of times.

22. The apparatus of claim 21 wherein the means for preparing comprises:
   means for blocking access to other applications attempting to access the specific grid compute node;
   means for negotiating with the requested application to provide periodic status messages; and
   means for obtaining an initial snapshot of the specific grid compute node prior to execution of the requested application.

23. The apparatus of claim 22 wherein the initial snapshot comprises all resources managed by the specific grid compute node, the resources including a listing of local files and directories, a total amount of used disk space, a list of used and free Transmission Control Protocol/Internet Protocol (TCP/IP) ports and memory usage and a number of executing processes.

24. The apparatus of claim 22 wherein the initial snapshot comprises an image stored in an advanced hardware management system over an application program interface (API).

25. The apparatus of claim 24 wherein the advanced hardware management system comprises a blade management system.

26. The apparatus of claim 22 wherein the means for recovering comprises:
   means for comparing a current snapshot with the initial snapshot; and
   means for adjusting differences found in the current snapshot in response to the comparing.

27. The apparatus of claim 22 wherein the means for recovering comprises:
   means for comparing a current snapshot with the initial snapshot; and
   means for rebooting the specific grid compute node in response to the comparing.

28. The apparatus of claim 22 wherein the means for recovering comprises:
   means for comparing a current snapshot with the initial snapshot; and
   means for installing a new image on the specific grid compute node.

29. The apparatus of claim 28 wherein the new image includes a software grid manager service residing inside a grid container.

30. The apparatus of claim 28 wherein the means for recovering further comprises means for reconnecting the specific grid compute node to the network.

* * * * *